Jan. 26, 1965    E. R. CORDOVA    3,166,817
APPARATUS FOR INTEGRAL MOLDING OF IRREGULARLY
SHAPED HOLLOW ARTICLES
Filed Feb. 23, 1961    4 Sheets-Sheet 1

INVENTOR.
Elmer R. Cordova
BY

ATTORNEYS

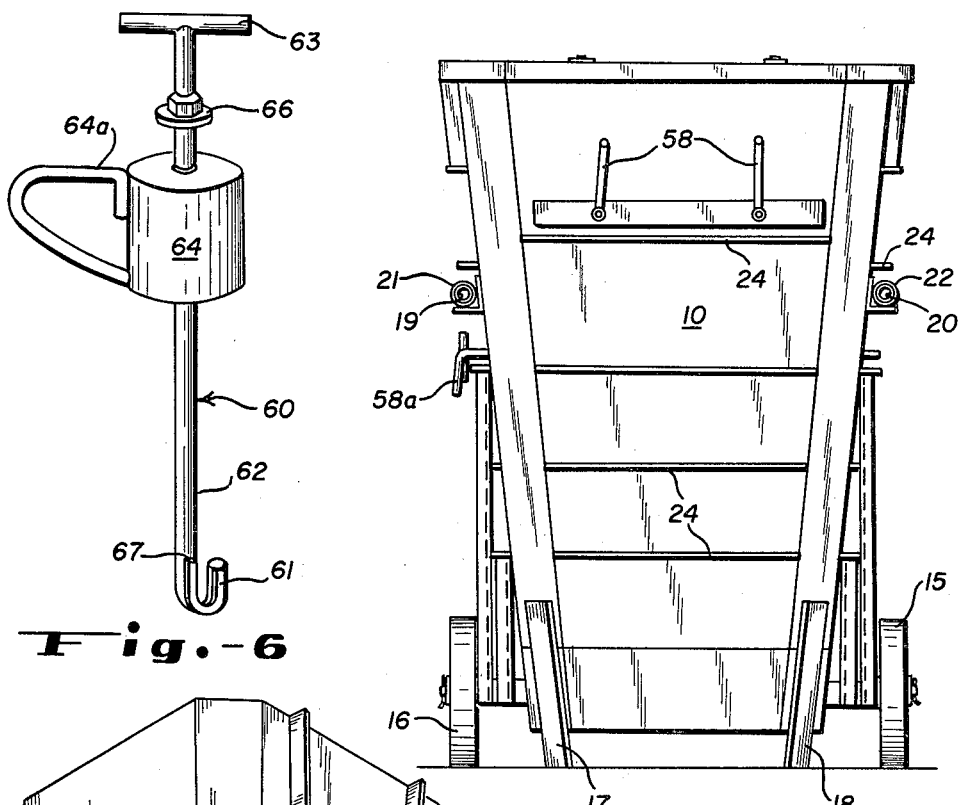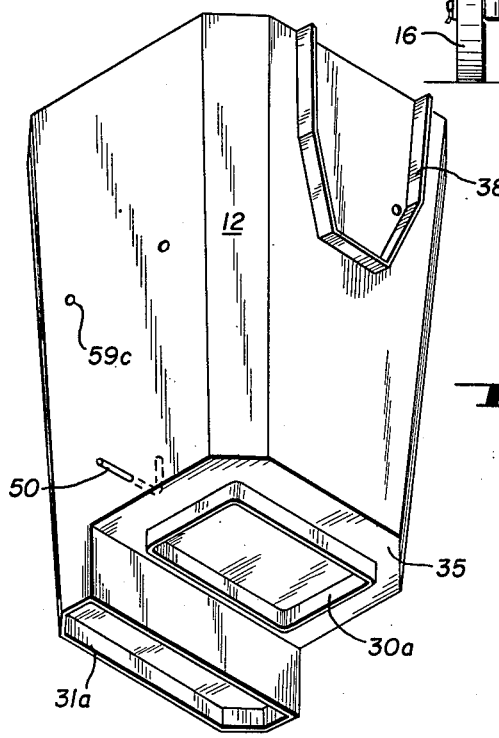

Jan. 26, 1965   E. R. CORDOVA   3,166,817
APPARATUS FOR INTEGRAL MOLDING OF IRREGULARLY
SHAPED HOLLOW ARTICLES
Filed Feb. 23, 1961   4 Sheets-Sheet 3
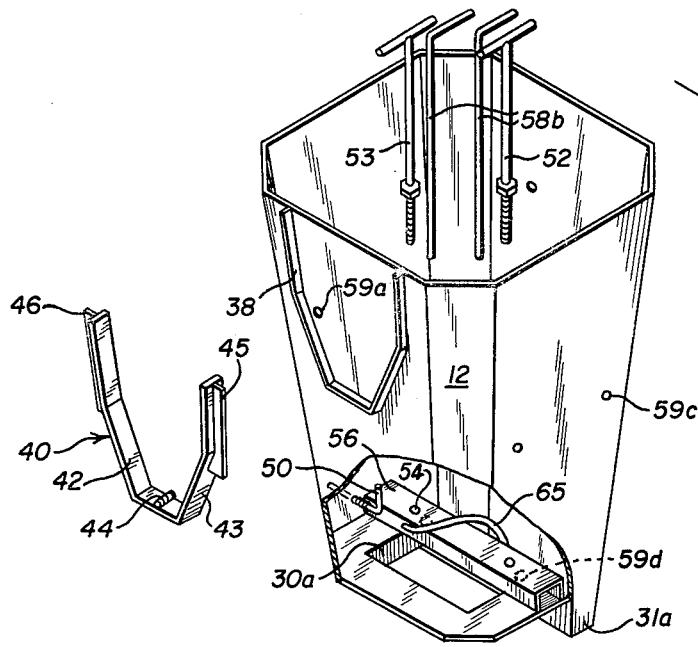
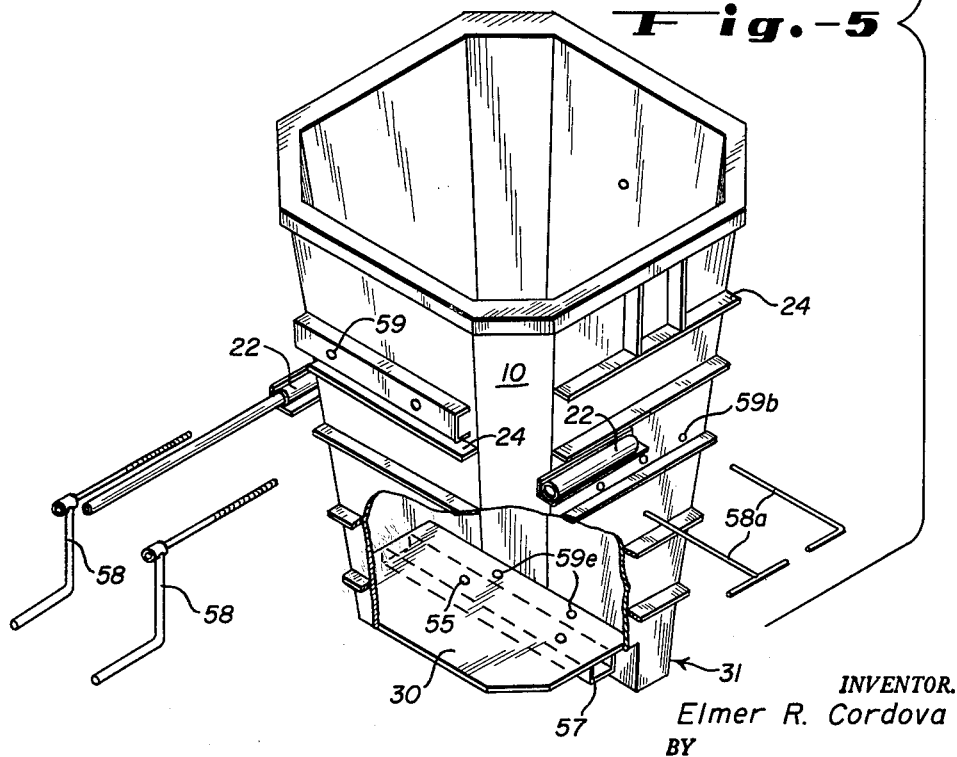
Fig.-5
INVENTOR.
Elmer R. Cordova
BY
ATTORNEYS INVENTOR.
Elmer R. Cordova
BY
ATTORNEYS 3,166,817
APPARATUS FOR INTEGRAL MOLDING OF IRREGULARLY SHAPED HOLLOW ARTICLES
Elmer R. Cordova, 5805 S. Santa Fe Drive, Littleton, Colo.
Filed Feb. 23, 1961, Ser. No. 91,251
3 Claims. (Cl. 25—130)

This invention is directed to apparatus for integrally forming irregularly shaped hollow bodies and, more particularly, is directed to method and apparatus utilizing easily portable, complementary, substantially two-piece mold structure which is adapted for repeated production of integral irregularly shaped hollow incinerator bodies substantially without deterioration of the mold structure components through such repeated production.

The use of multiple component casting or molding structures has been well known in the art since the days of the ancient Greeks. Casting or molding irregularly shaped hollow bodies is perhaps as old. However, the earlier efforts relative to molding irregular and hollow bodies usually required destruction of at least a portion of the mold structure to remove the cast body (wax molding techniques are exemplary wherein the wax inner mold component is destroyed by melting). In some industries temporary sand molds are used, but these techniques are normally not employed for molding hollow bodies.

More contemporary workers have suggested use of interlocking multi-component inner and outer mold forms usually interconnected with some sort of apparatus for expansion and contraction thereof; or multi-hinged constructions. More crude methods have required the use of a sledge hammer or the like to separate the forms from the cast body and from each other. This, of course, drastically reduced the useful life of the forms and quite frequently resulted in damage or destruction of the cast body. More refined methods and apparatus have utilized hydraulic systems for exerting great pressures on the various mold components and/or the cast body to separate them from each other. One worker in the art has suggested the use of the principle of leverage as an inexpensive substitute for such hydraulic systems.

My invention is a decided departure from the above methods and apparatus and takes advantage of the phenomenon of a temporarily integral assembly of mold parts and the congealed or set molded body which has been the enigma of prior workers. In such a temporarily integral assembly respective abutting faces and surfaces of the cast body and mold parts are adhesively cemented or joined together. However, the juncture is an area of weakness in the temporary assembly.

The brute strength methods discussed above have all been designed to some extent to break the mold parts from the cast body over the extent of the adhesive junctures. However, the brute strength methods have not been entirely successful since, in many instances, the cast body has not uniformly set; and in some areas a portion of the envelope of adhesive juncture is stronger than an unset or incompletely cured area of the cast body. Thus, when brute force is exerted, chunks are removed from the cast body with the mold sections. And not only is the molded article a failure, but manual labor must be expended to clean the mold parts.

In the practice of my method I use a combination of forces exerting shearing stress and concussion energy to destroy such envelopes of adhesive juncture without applying any extensive pressure or brute force against the cast body or the mold components. Briefly, this is done by using externally applied apparatus which is adapted to grip a lower portion of the inside of an inner mold member and bear against or seat on an upper peripheral surface area of the outer mold member and apply tension between those members to induce a shearing stress along the respective limits of the inner and outer mold surfaces where they are temporarily joined to the cast body (which limits are referred to herein as "envelopes of adhesive juncture"). While the above shearing stress is applied over the said envelopes of adhesive juncture, I transmit impact induced concussion energy through the mold components and the cast body which coacts with the above mentioned shearing stress to disintegrate and destroy the envelopes of adhesive juncture with substantially no deleterious effect to the cast body, per se, and no damage to the mold parts.

It is another object of my invention to provide simple and easily used apparatus for the practice of my inventive method.

It is also an object of my invention to provide apparatus for the integral casting of hollow, irregularly shaped incinerator bodies.

A more thorough understanding of my invention and novel apparatus for the practice thereof may be had from the description hereafter. Also, a study of the appended exemplary drawings will make the novel, unobvious and inventive character of my method and apparatus more readily apparent to those skilled in the art. In these drawings:

FIG. 2 is a rear elevation of the apparatus of FIG. 1;

FIG. 3 is a perspective view of an inner mold member usable with the apparatus of FIGS. 1 and 2;

FIG. 5 is an exploded perspective view of the apparatus of FIGS. 1 through 4 showing their relationship to auxiliary members and tools utilized to temporarily interconnect and maintain the main molding apparatus in operative relation during pouring and curing of a body being cast;

Figure 7:
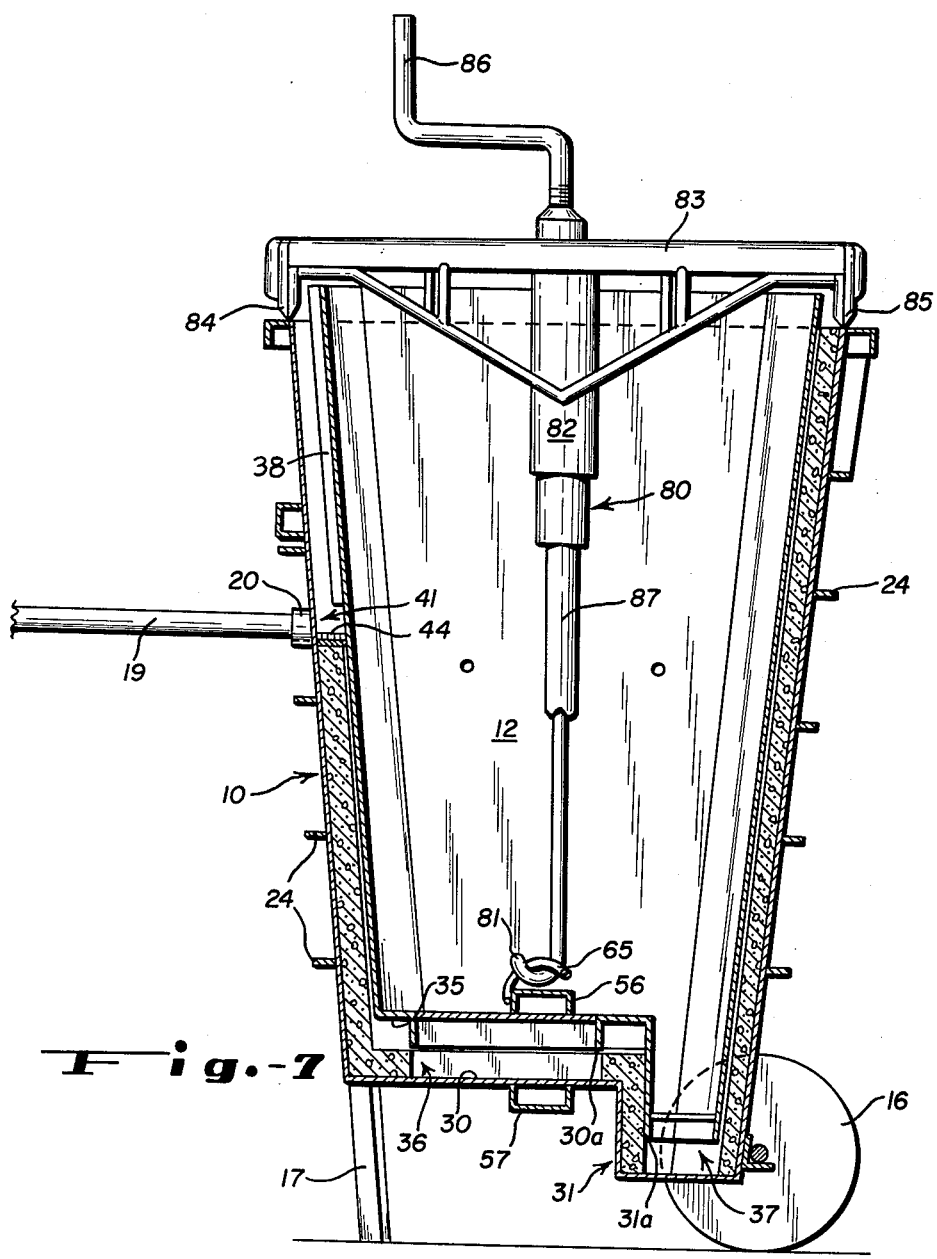

FIG. 6 is a novel tool usable with the apparatus of FIGS. 1 through 5 for inducing the transmission of concussion energy through the molding apparatus and a cured body; and FIG. 7 is a side elevation in partial section of the molding apparatus with a cured body therein depicting their relation with externally applied apparatus used for inducing shearing stresses through the envelopes of adhesive juncture between the mold parts and such a cured body.

Before describing the drawings in detail, I wish it understood that they are but exemplary of possible apparatus which may be utilized for practicing my inventive concepts and that the true measure of the spirit and scope of my invention is to be as set forth in the hereafter appended claims.

Figure 1:
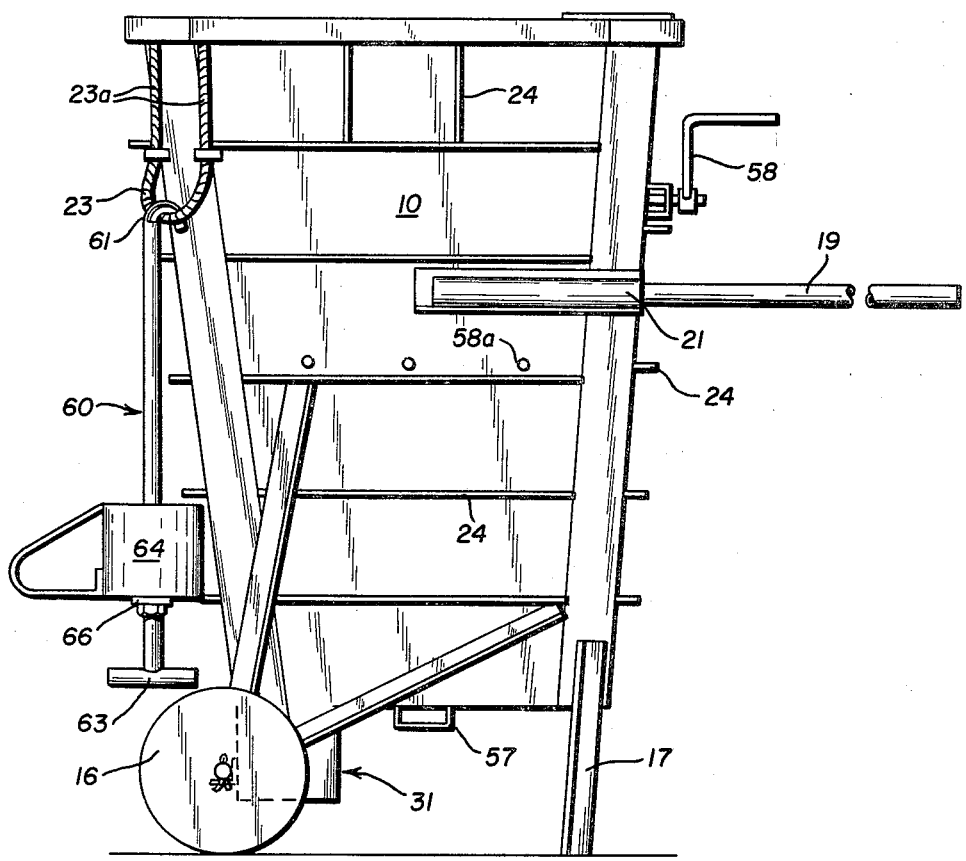
FIG. 1 is a side elevation of novel portable apparatus usable in practicing a method according to my inventive concepts.
Figure 4:
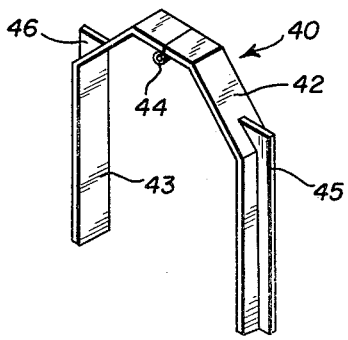
FIG. 4 is a perspective view of an auxiliary mold piece usable with the main molding apparatus of FIGS. 1 through 3.

The exemplary apparatus of the drawings is designed for the integral casting, in one pouring operation, of an outdoor incinerator of the type normally found in urban residential areas for burning combustible trash and the like, and is comprised essentially of two main mold forms which, with use of suitable auxiliary tools and parts, spatially form a volume, the confines of which define the irregular, hollowing shaping of an incinerator body to be formed. The main outer form 10 is best seen in FIGS. 1 and 2, and the complementary hollow, main inner form 12 is best seen in FIG. 3. The outer form is supported on the bottom at its forward end by undercarriage rotatably carrying spaced apart ground supported wheels 15 and 16; and is supported at the rear end by spaced apart fixed struts 17 and 18. A pair of removable handles 19 and 20 adapted for selective complementary insertion in the sleeves 21 and 22 mounted on the outer mold provides leverage for an operator wishing to lift the struts 17 and 18 from the ground to move the mold structure from place to place on its wheels.

A loop 23 having elongated legs 23a integrally joined to the outer surface of the mold 10 and adapted for releasable engagement with a complementary hook or loop 61 of the tool 60 (which is described in detail hereafter with reference to FIG. 6) and the strengthening ribs 24 (which also serve to increase the efficiency of heat transfer to the atmosphere) substantially complete the exterior of the main outer mold structure. The interior walls of the outer mold form an annular, upwardly diverging, generally octogonal volume which is complementary to but larger than the upwardly diverging, generally octagon-shaped exterior surfaces of the inner mold 12.

Adjacent the smaller portion or bottom of the interior of the outer mold 10 is an inwardly extending shoulder 30 which is attached across the rear and a major portion of the side walls and to a stepped portion 31 (best seen in FIGS. 5 and 7). The two-section bottom surface thus formed by the shoulder 30 and the stepped portion 31 is adapted to support, respectively, the peripheral surfaces of the volume enclosing lips 30a and 31a on the exterior of the two-section bottom surface 35 of the inner mold 12 in a substantially liquid sealing relation therewith sufficient to prevent leakage of fluid plastic or cementitious material when the molds are assembled and in use, as is described in detail hereafter.

The lips 30a and 31a space the two-section bottom surface 35 of the inner mold a distance from the two-section bottom surface of the outer mold in a position adapted to form a trash receiving opening 36 and a chimney opening 37 in the top of an incinerator being cast (see FIG. 7). The lip 38, which is integrally attached to a face of the inner mold 12, is adapted to cooperate with the auxiliary mold member 40 to define an ash removal opening as generally indicated at 41 in FIG. 7. The auxiliary mold member 40 is comprised essentially of two substantially identical bent metal strips 42 and 43 connected at abutting upper edges by a spring loaded hinge 44 arranged to maintain the member 40 in the configuration shown in FIG. 4 for seating over the substantially identical configuration of the lip 38 and span the distance between the opposed surfaces of the inner and outer molds.

From the exterior surface of each of the strips 42 and 43 extend substantially identical knives 45 and 46. It should be noted that these knives are positioned intermediate the longitudinal edges of the strips 42 and 43 and are for the purpose of forming opposed slots around the ash discharge opening 41 which will be adapted to maintain a slidable door therein (which is not shown in the drawings).

Referring now to FIG. 5, to assemble the inner mold 12 within the outer mold 10 for a casting operation, the procedure is substantially as follows: The spring plungers 50 which extend through opposed side walls of the inner mold member to form a portion of an arrangement for supporting grate structure, are retracted and the inner mold 12 lowered within the outer mold to a supporting relation between the shoulder 30 and stepped portion 31, and lips 30a and 31a as described above. Elongated rods 52 and 53 having externally threaded lower portions are threadedly engaged through aligned openings 54 and 55 in the integral bars 56 and 57 which extend, respectively, across the bottom portions of the inner mold 12 and the outer mold 10. The elongated rods 52 and 53 are of substantial strength and assure the maintenance of a rigid and substantially immovable interconnection between the respective inner and outer molds when they are assembled.

A plurality of elongated bars 58 and 58a are inserted through respective aligned openings such as 59, 59a, and 59b and 59c of the inner and outer molds. The bars 58 assure the maintenance of the auxiliary mold member 40 in its proper position about the lip 38 of the inner mold, while the bars 58a and the respective aligned openings of the inner and outer molds form apertures in a cast incinerator to complete the mounting arrangement for reception of the above mentioned grate assembly. The elongated rods 58b are arranged to pass through aligned openings 59d and 59e in the bottom surfaces of the respective inner and outer molds to form apertures in a cast incinerator for the later attachment of an incinerator lid.

When the foregoing mold sections and related apparatus are arranged in substantially rigid interconnection, fluid plastic or cementitious material is poured through the opening between the inner and outer molds until the volume therebetween is substantially filled. After a period of time sufficient for the cementitious material to set and cure to a self-sustaining condition, the rods 58, 58a, 52 and 53, and the lid rods 58b, are all removed; and the upwardly extending loop 65 attached to the bar 56 is engaged by the terminal hook 81 of the externally applied apparatus 80. The externally applied apparatus is comprised essentially of a main upright body portion 82 integrally joined to the horizontal crossbar 83. The respective opposite end portions of the crossbar 83 have downwardly extending protuberances or feet 84 and 85 adapted to seat on opposed side portions of the upper peripheral surface of the outer mold 10 and space the crossbar thereabove.

Internally of the main body portion 82 is a jack-screw assembly which, through rotation of the handle 86, shortens and extends the telescoping shaft assembly 87 carrying the loop or hook 81 and which is adapted to thereby apply tension between the inner and outer molds and impart a shearing stress along the envelopes of adhesive juncture between a cast body and the mold parts. A jack-screw assembly has not been shown in detail since they are well known in the art and may be of any design which will accomplish the lengthening and shortening of the shaft 87 to thereby apply the above mentioned tension between the inner and outer molds. Of course, hydraulic means, etc., could be used. However, they must necessarily include controls such that no more than the desired tension will be imparted. As was noted above, great application of pressure is not desirable since it may result in the breaking off of chunks from a cast body in a separating operation.

FIG. 6 is a detailed view of a novel tool which I use for transmitting concussion energy through the mold forms and a cast body. The tool is comprised essentially of an elongated substantially linear shaft 62 having a terminal hook 61 at one end and a manipulating handle 63 at the other end. Movably mounted on the shaft 62 is a body 64a having a manipulating member 64' attached to one side thereof. Immediately below the handle 63 is a limit collar 66 and immediately above the hook 61 are limit seats 67. These serve to define the range of a stroke through which the body 64 may move.

In use (note FIG. 1), the hook 61 is engaged through the loop 23 of the outer mold. An operator grips the handle 63 and maintains the shaft 62 in a taut relation and at an angle to the outer mold. The body 64 is then raised to the limit 67 and either dropped or somewhat forcefully thrown against the lower limiting collar 66. When the body strikes the collar 66 the impact therebetween induces the transmission of concussion energy through the shaft 62, loop 23, its elongated legs 23a, and thus throughout the extent of the interconnected inner and outer mold structures and a cast body, and causes shock waves internally of the hollow inner mold, which concussion energy and shock waves cooperate with the above mentioned shearing stress to disintegrate and destroy the envelopes of adhesive juncture without any damage to the cast body or injury to the mold components.

In the use of the foregoing described apparatus and in practicing my method, some change in the sequence of operations is possible and, indeed, is sometimes necessary depending on whether the cementitious material forming the cast body is green or well set up. When the concrete is well set up there tends to be some shrinkage of the cast body which tends to make the envelope of adhesive juncture with the inner mold a much stronger one than that with the outer mold. In such an instance, upon use of the externally applied apparatus 80 to induce tension between the inner and outer molds, the cast body and inner mold may separate from the outer mold. Conversely, if the cementitious body is green and not well set up, the condition illustrated in FIG. 7 is likely to occur, i.e., upon application of the externally applied apparatus to exert a tension between the inner and outer molds, the inner mold may separate from the interior surface of the cured body.

In either of these cases it is desirable to induce the concussion energy through the envelopes of adhesive juncture as above described before any substantial tension is applied by the externally applied assembly 80 so that both the envelopes of adhesive juncture will be destroyed. Normally, however, there are envelopes of adhesive juncture between both of the molds and the cast body of some strength, in which case the shearing stress and transmission of concussion energy are imparted through the envelopes of adhesive juncture substantially simultaneously.

Upon destruction of the said envelopes of adhesive juncture, the externally applied assembly is used to lift the inner mold from the cast body and outer mold and into a position where other apparatus or workers may completely remove it from the molding apparatus. Thereafter, the outer mold is gently inverted and the cast body allowed to slide therefrom.

Having thus described my invention with sufficient particularly and distinctness as to allow those skilled in the art to practice it, what I desire to have protected by Letters Patent is set forth in the appended claims.

I claim:

1. Apparatus for integrally casting an outdoor incinerator body comprising: an upwardly diverging annular outer mold and an upwardly diverging, hollow, inner mold which cooperate, when assembled, to spatially define a volume the confines of which form the shaping of a generally rectangular relatively thin substantially upright wall of a said incinerator body, a stepped two-section bottom in both said inner and outer molds having an open bottom and a partially open top wall, a volume-enclosing lip integral with each section of the outside bottom surface of the inner mold supporting it on the interior surface of the stepped bottom surface of the outer mold in a substantially leak-proof relationship therewith and one cooperatively forming an incinerator chimney with an opening therethrough and the other cooperatively forming an upper wall of an incinerator body with a trash opening therethrough, another lip integral with an upper portion of an outer side wall of the inner mold having a width less than the distance between the assembled inner and outer molds, an auxiliary mold form adapted to be mounted in engagement with said another lip and span the distance between the interior surface of the outer mold and the exterior surface of the inner mold when assembled to form a trash removal opening in the lower part of a wall in a said incinerator body, releasable means connecting the bottom surfaces of each of the inner and outer molds releasably locking each other in rigid engagement when the apparatus is assembled, there being a plurality of aligned openings in opposed side walls of both the inner and outer molds, an elongated rod mounted in each aligned opening forming apertures through opposed walls of a said incinerator body for the later reception of a grate structure, there being at least two other aligned openings in the bottom surfaces of each of the inner and outer molds, and a rod mounted in each said other aligned opening forming apertures through the upper surface of said incinerator body adjacent the opening in said upper surface of a said incinerator body for the later attachment of an incinerator lid.

2. Apparatus according to claim 1 in which said other lip integral with an upper portion of the outer side wall includes opposed flanges centrally mounted normal thereto and extending into the space between said inner and outer molds forming a door slot adjacent said trash removal openings.

3. Apparatus for integrally forming irregularly shaped hollow bodies having a depth which is substantially greater than their cross-sectional dimensions and having a plurality of openings comprising: inner and outer generally rectangular complementary hollow mold sections arranged to telescope together in a substantially leakproof assembly, the inner mold section being smaller than the outer mold section to spatially define a volume the confines of which form a relatively thin continuous wall with the shape of the body to be formed with an open bottom and partially open top wall, said assembly having an upper opening for ingress of fluid cementitious material between said mold sections, means for separating said mold sections including hook engaging means in a lower internal portion of said inner mold, pull means having a hook releasably connected to said hook engaging means and including support means mounted on opposed portions of the top of the outer mold for simultaneously applying separating tension between said inner mold and the formed body in said outer mold pulling said inner mold from said outer mold, second engaging means integrally attached to the outer surface of said outer mold, a shaft having a lower stop means mounted on said second engaging means, and a manually operated gravity actuated impact energy inducing apparatus mounted on said shaft and arranged to be stopped by said stop means for periodically transmitting concussion energy through the assembled inner and outer molds and cementitious material contained therein.

References Cited in the file of this patent

UNITED STATES PATENTS

| | | |
|---|---|---|
| 774,007 | Tinstman | Nov. 1, 1904 |
| 1,365,124 | Persson | Jan. 11, 1921 |
| 1,684,978 | Urban | Sept. 18, 1928 |
| 1,897,340 | Sielaff | Feb. 14, 1933 |
| 2,068,302 | Nickol | Jan. 19, 1937 |
| 2,356,852 | Hutchinson | Aug. 29, 1944 |
| 2,480,804 | Yeager et al. | Aug. 30, 1949 |
| 2,661,518 | Carlson | Dec. 8, 1953 |
| 2,717,435 | Livingston et al. | Sept. 13, 1955 |
| 2,820,672 | Arce et al. | Jan. 21, 1958 |
| 2,870,513 | Gagne | Jan. 27, 1959 |
| 2,873,504 | Lager | Feb. 17, 1959 |
| 2,884,901 | Chandler | May 5, 1959 |
| 2,936,504 | Harris | May 17, 1960 |
| 2,954,596 | Fassauer et al. | Oct. 4, 1960 |